United States Patent
Sebire et al.

(10) Patent No.: US 9,681,340 B2
(45) Date of Patent: Jun. 13, 2017

(54) SIGNALING FRAMEWORK FOR ASSISTANCE INFORMATION

(75) Inventors: Benoist Pierre Sebire, Tokyo (JP); Woonhee Hwang, Espoo (FI); Henri Markus Koskinen, Espoo (FI); Jarkko T. Koskela, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 123 days.

(21) Appl. No.: 14/400,854

(22) PCT Filed: May 14, 2012

(86) PCT No.: PCT/EP2012/058940
§ 371 (c)(1),
(2), (4) Date: Jan. 26, 2015

(87) PCT Pub. No.: WO2013/170878
PCT Pub. Date: Nov. 21, 2013

(65) Prior Publication Data
US 2015/0172969 A1    Jun. 18, 2015

(51) Int. Cl.
*H04W 36/06* (2009.01)
*H04W 36/00* (2009.01)

(52) U.S. Cl.
CPC ... *H04W 36/0072* (2013.01); *H04W 36/0016* (2013.01)

(58) Field of Classification Search
None
See application file for complete search history.

(56) References Cited

U.S. PATENT DOCUMENTS

| 7,796,557 | B2 |   | 9/2010  | Xue et al. ........................ 370/332 |
| 7,818,006 | B2 | * | 10/2010 | Kim ..................... H04W 36/0005 370/331 |
| 8,289,922 | B2 | * | 10/2012 | Ewe ................... H04W 36/0033 370/252 |
| 8,467,781 | B2 | * | 6/2013  | Lee ........................ H04W 24/10 370/252 |
| 8,476,781 | B2 | * | 7/2013  | Tsumagari ............. H02K 7/003 290/44 |

(Continued)

FOREIGN PATENT DOCUMENTS

| EP | 2200367 A1 | 6/2010 |
| KR | 10-2010-0071796 A | 6/2010 |
| KR | 2010/0118536 A1 | 11/2010 |

OTHER PUBLICATIONS

R2-121349; MediaTek; "IDC Information Forwarding at Handover"; 3GPP TSG RAN WG2 Meeting #77bis; Jeju, Korea, Mar. 26-30, 2012.

(Continued)

*Primary Examiner* — Andrew Lai
*Assistant Examiner* — Jamaal Henson
(74) *Attorney, Agent, or Firm* — Harrington & Smith (57) ABSTRACT

The present invention provides methods, apparatuses and a program relating to a signaling framework for assistance information. The present invention includes composing, at a source base station, to which a user equipment is connected, a first signaling message including information whether a target base station, to which handover of the user equipment is to be performed, supports assistance information, and transmitting the first signaling message to the user equipment.

9 Claims, 5 Drawing Sheets

(56) References Cited

U.S. PATENT DOCUMENTS

| | | | |
|---|---|---|---|
| 8,750,181 B2* | 6/2014 | Purnadi | H04L 65/4076 370/310 |
| 8,849,282 B2* | 9/2014 | Serravalle | H04W 36/0016 455/436 |
| 2005/0201382 A1* | 9/2005 | Xue | H04W 8/205 370/395.21 |
| 2013/0083715 A1* | 4/2013 | Etemad | H04W 52/04 370/312 |

OTHER PUBLICATIONS

R2-121636; Alcatel-Lucent, et al.; "UE behavior if SAIs in SI is not provided"; 3GPP TSG-RAN WG2 Meeting #77bis; Mar. 26-30, 2012, Jeju, Korea.

Ericsson et al.; "MBMS interest indication and RRC signaling details"; R2-121560; 3GPP TSG-RAN WG2 #77bis; Jeju, South Korea; Mar. 26-30, 2012; whole document (9 pages).

LG Electronics Inc.; "[77#30] —LTE: MBMS interest indication"; R2-121385; 3GPP TSG-RAN WG2 #77bis; Jeju, South Korea; Mar. 26-30, 2012; whole document (10 pages).

LG Electronics Inc.; "Handling of MBMS Interest Indication for Mobility"; R2-121388; 3GPP TSG-RAN WG2 #77bis; Jeju, South Korea; Mar. 26-30, 2012; whole document (2 pages).

Nokia Siemens Networks et al.; "MBMS service continuity and CSG cells"; R2-121094; 3GPP TSG-RAN WG2 #77bis; Jeju, South Korea; Mar. 26-30, 2012; whole document (3 pages).

LG Electronics Inc.; "Further discussion on MBMS interest indication"; R2-116292; 3GPP TSG-RAN WG2 #76; San Francisco, USA; Nov. 14-18, 2011; whole document (2 pages).

3GPP TS 25.321 V11.0.0; "$3^{rd}$ Generation Partnership Project; Technical Specification Group Radio Access Network; Medium Access Control (MAC) protocol specification (Release 11)"; Dec. 2011; whole document (198 pages).

3GPP TS 36.331 V10.5.0; "$3^{rd}$ Generation Partnership Project; Technical Specification Group Radio Access Network; Evolved Universal Terrestrial Radio Access (E-UTRA); Radio Resource Control (RRC); Protocol specification (Release 10)"; Mar. 2012; whole document (302 pages).

Pantech; "IDS trigger procedure"; R2-121310; 3GPP TSG-RAN WG2 Meeting #77bis; Jeju, Korea; Mar. 26-30, 2012; whole document (7 pages).

* cited by examiner

SIGNALING FRAMEWORK FOR ASSISTANCE INFORMATION

FIELD OF THE INVENTION

The present invention relates to a signaling framework for assistance information. More particularly, the present invention relates to methods, apparatuses and a program relating to a signaling framework for assistance information, for example, in LTE.

BACKGROUND OF THE INVENTION

In the course of Release 11 standardisation, signalling support for conveying assistance information from a user equipment (UE) is being discussed for multimedia broadcast-multicast service (MBMS), in-device coexistence (IDC) and enhancements for diverse data applications (EDDA). While the information needed to assist the network in case of MBMS, IDC and EDDA differ in nature, it would be beneficial to have a common framework for the reporting. Moreover, there may be such features in the future that the evolved NodeB (eNB) requires some assistance information from UE. Thus the same framework as in the present application can be used in such cases.

One of the problems related to the handling of assistance information is that the UE needs to know whether the eNB supports the signalling. Further, at handover, the overhead needs to be minimized. Another problem in this regard is that mobility across eNBs of different releases or having different set of functionalities must be supported.

In this regard, in order to reduce overhead, in high speed uplink packet access (HSUPA), for the Scheduling Information (needed to assist the eNB in making scheduling decisions), it has been specified for the UE that if an enhanced dedicated channel (E-DCH) serving cell change occurs and if the new E-DCH serving cell was not part of the previous Serving E-DCH radio link set (RLS), the transmission of a Scheduling Information shall be triggered on that frequency, as described in document [1].

In order to let the UE know whether the eNB supports the signalling, it has been proposed to add signalling to let the UE know whether assistance information are needed, but without addressing the mobility issue, as described in document [2].

For mobility, it has been proposed that the UE should follow an order given by the target cell whether to report the assistance information after handover or not, as described in document [3]. Further, the options of UE receiving the confirmation of [assistance-information] context transfer from a target cell, and of UE always reporting assistance information after handover have been discussed in document [4].

Moreover, for proximity indication, proximity reporting of CSG cells is enabled by network (NW) dedicated configuration to the UE (otherConfig in RRC specification[5]). UE will only report proximity of closed subscriber group (CSG) cells if configured by the NW. Proximity status is not transferred between cells and thus UE needs retransmit proximity at cell change if UE still considers proximity being valid.

REFERENCES

[1]: 3GPP TS 25.321, V11.0.0, December 2011.
[2]: R2-121094, "MBMS service continuity and CSG cells", Nokia Siemens Networks, Nokia Corporation, 3GPP TSG-RAN WG2 Meeting #77bis, Jeju, Korea, 26-30 Mar. 2012.
[3]: R2-12156, "MBMS interest indication and RRC signaling details", Ericsson, ST-Ericsson, 3GPP TSG-RAN WG2 #77bis, Jeju, South Korea, Mar. 26-30, 2012.
[4]: R2-116292, "Further discussion on MBMS interest indication", LG Electronics Inc., 3GPP TSG-RAN WG2 #76, San Francisco, USA, Nov. 14-18, 2011
[5]: 3GPP TS 36.331, V10.5.0, March 2012.

SUMMARY OF THE INVENTION

According to the present invention, there are provided methods, apparatuses and a program relating to a signaling framework for assistance information.

According to an aspect of the invention there is provided a method comprising:
composing, at a source base station, to which a user equipment is connected, a first signaling message including information whether a target base station, to which handover of the user equipment is to be performed, supports assistance information, and
transmitting the first signaling message to the user equipment.

According to further refinements as defined under the above aspect, the method further comprises
composing, at the source base station, a second signaling message including information whether the source base station supports assistance information, and
transmitting the second signaling message to the user equipment.

According to further refinements as defined under the above aspect,
the first signaling message is sent at handover of the user equipment;
the second signaling message is sent at a time of connection reconfiguration after connection setup;
each of the first and second signaling message is the same kind of message;
each of the first and second signaling message is a RRCConnectionReconfiguration message.

According to another aspect of the invention there is provided a method comprising,
composing, at a base station, to which handover of a user equipment is to be performed, a signaling message including information whether the base station supports assistance information, and
transmitting the signaling message to another base station to which the user equipment is connected.

According to another aspect of the invention there is provided a method comprising,
composing, at a base station, to which handover of a user equipment is to be performed, a signaling message including information whether the base station supports assistance information, and
transmitting the signaling message to the user equipment.

According to further refinements as defined under the above aspect, the signaling message is sent at handover of the user equipment.

According to another aspect of the invention there is provided a method comprising
receiving, at a user equipment, a first signaling message including information whether a target base station, to which handover of the user equipment is to be performed supports assistance information,
receiving, at the user equipment, a second signaling message including information whether a source base station, to which the user equipment is connected, supports assistance information, and determining, based on the information included in the first signaling message and the second signaling message, whether each of the source base station and the target base station supports assistance information.

According to further refinements as defined under the above aspects, if it is determined that both the source base station and the target base station support assistance information,
transmitting, by the user equipment, assistance information to the target base station only if the assistance information differs from the assistance information transmitted previously to the source base station;

if it is determined that the source base station supports assistance information and the target base station does not support assistance information,
inhibiting transmitting assistance information when the user equipment is connected to the target base station until the user equipment is disconnected from the target base station;

if it is determined that the source base station does not support assistance information and the target base station supports assistance information,
transmitting assistance information to the target base station when the user equipment is connected to the target base station;

each of the first signaling message and the second signaling message is the same kind of message;

each of the first signaling message and the second signaling message is a RRCConnectionReconfiguration message;

According to another aspect of the invention there is provided a base station comprising a composing unit configured to compose a first signaling message including information whether a target base station, to which handover of the user equipment is to be performed, supports assistance information, and transmitting the first signaling message to the user equipment.

According to further refinements as defined under the above aspects, the composing unit is further configured to compose a second signaling message including information whether the base station supports assistance information, and transmitting the second signaling message to the user equipment;

the first signaling message is sent at handover of the user equipment;

the second signaling message is sent at a time of connection reconfiguration after connection setup;

each of the first and second signaling message is the same kind of message;

each of the first and second signaling message is a RRCConnectionReconfiguration message.

According to another aspect of the invention there is provided a base station to which handover of a user equipment is to be performed, comprising, a composing unit configured to compose a signaling message including information whether the base station supports assistance information, and transmitting the signaling message to another base station to which the user equipment is connected.

According to another aspect of the invention there is provided a base station to which handover of a user equipment is to be performed, comprising, a composing unit configured to compose a signaling message including information whether the base station supports assistance information, and transmitting the signaling message to the user equipment.

According to further refinements as defined under the above aspects, the signaling message is sent at handover of the user equipment;

the signaling message is a RRCConnectionReconfiguration message.

According to another aspect of the invention there is provided a user equipment, comprising a receiver/transmitter configured to receive a first signaling message including information whether a target base station, to which handover of the user equipment is to be performed supports assistance information, further configured to receive a second signaling message including information whether a source base station, to which the user equipment is connected, supports assistance information, and a determining unit configured to determine, based on the information included in the first signaling message and the second signaling message, whether each of the source base station and the target base station supports assistance information.

According to further refinements as defined under the above aspects, if it is determined that both the source base station and the target base station support assistance information,
the receiver/transmitter being further configured to transmit assistance information to the target base station only if the assistance information differs from the assistance information transmitted previously to the source base station;

if it is determined that the source base station supports assistance information and the target base station does not support assistance information,
the receiver/transmitter being further configured to inhibit transmitting assistance information when the user equipment is connected to the target base station until the user equipment is disconnected from the target base station;

if it is determined that the source base station does not support assistance information and the target base station supports assistance information,
the receiver/transmitter being further configured to transmit assistance information to the target base station when the user equipment is connected to the target base station;

each of the first signaling message and the second signaling message is the same kind of message;

each of the first signaling message and the second signaling message is a RRCConnectionReconfiguration message.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to another aspect of the invention there is provided base station, to which a user equipment is connected, comprising
means for composing a first signaling message including information whether a target base station, to which handover of the user equipment is to be performed, supports assistance information, and
means for transmitting the first signaling message to the user equipment.

According to another aspect of the invention there is provided a base station, to which handover of a user equipment is to be performed, comprising,
means for composing a signaling message including information whether the base station supports assistance information, and
means for transmitting the signaling message to another base station to which the user equipment is connected.

According to another aspect of the invention there is provided a base station, to which handover of a user equipment is to be performed, comprising,
means for composing a signaling message including information whether the base station supports assistance information, and
means for transmitting the signaling message to the user equipment is connected.

According to another aspect of the invention there is provided a user equipment, comprising
means for receiving a first signaling message including information whether a target base station, to which handover of the user equipment is to be performed supports assistance information, further
means for receiving a second signaling message including information whether a source base station, to which the user equipment is connected, supports assistance information, and
means for determining, based on the information included in the first signaling message and the second signaling message, whether each of the source base station and the target base station supports assistance information.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION

In the following, embodiments of the present invention are described by referring to general and specific examples of the embodiments, wherein the features of the embodiments can be freely combined with each other unless otherwise described. It is to be understood, however, that the description is given by way of example only, and that the described embodiments are by no means to be understood as limiting the present invention thereto.

According to an embodiment of the present invention, the following aspects are proposed. It is noted that the following aspects can be combined in an arbitrary manner.

According to a first aspect of the present invention, a dedicated signaling message is used to signal in a dedicated manner whether the current cell supports the assistance information at connection reconfiguration right after connection setup.

Further, the dedicated signaling message is used to signal in a dedicated manner whether the target supports the assistance information at handover (HO).

In a preferred option, the otherConfig information element in the RRC message RRCConnectionReconfiguration is used for such a dedicated signaling message.

Hence, in view of the above, the signaling message is sent at connection reconfiguration right after connection setup and the signaling message is also sent at handover.

On the basis of the above signaling messages, the UE can determine whether the source base station and the target base station understand the assistance information.

According to a second aspect, if according to these received signaling messages the assistance information is understood both in the source and in the target base station, the UE needs to send only new information (i.e. information that has changed from the previous information sent) after HO.

According to a third aspect, if according to these received signaling messages the assistance information is understood in the source but not in the target base station, the UE does not send assistance information as long as it remains in the target.

According to a fourth aspect, if according to these received signaling messages the assistance information is not understood in the source but is understood in the target, the UE should send the assistance information as soon as it enters the target.

During the handover preparation, the source provides the most up-to-date received UE assistance information to the target. Thus, the target can utilize that information if it supports it, even if the UE does not report again after the handover.

This allows a common framework for the reporting of assistance information which efficiently supports mobility across eNBs of different releases or eNBs of having different support for assistance information while minimizing the uplink overhead.

Figure 1:
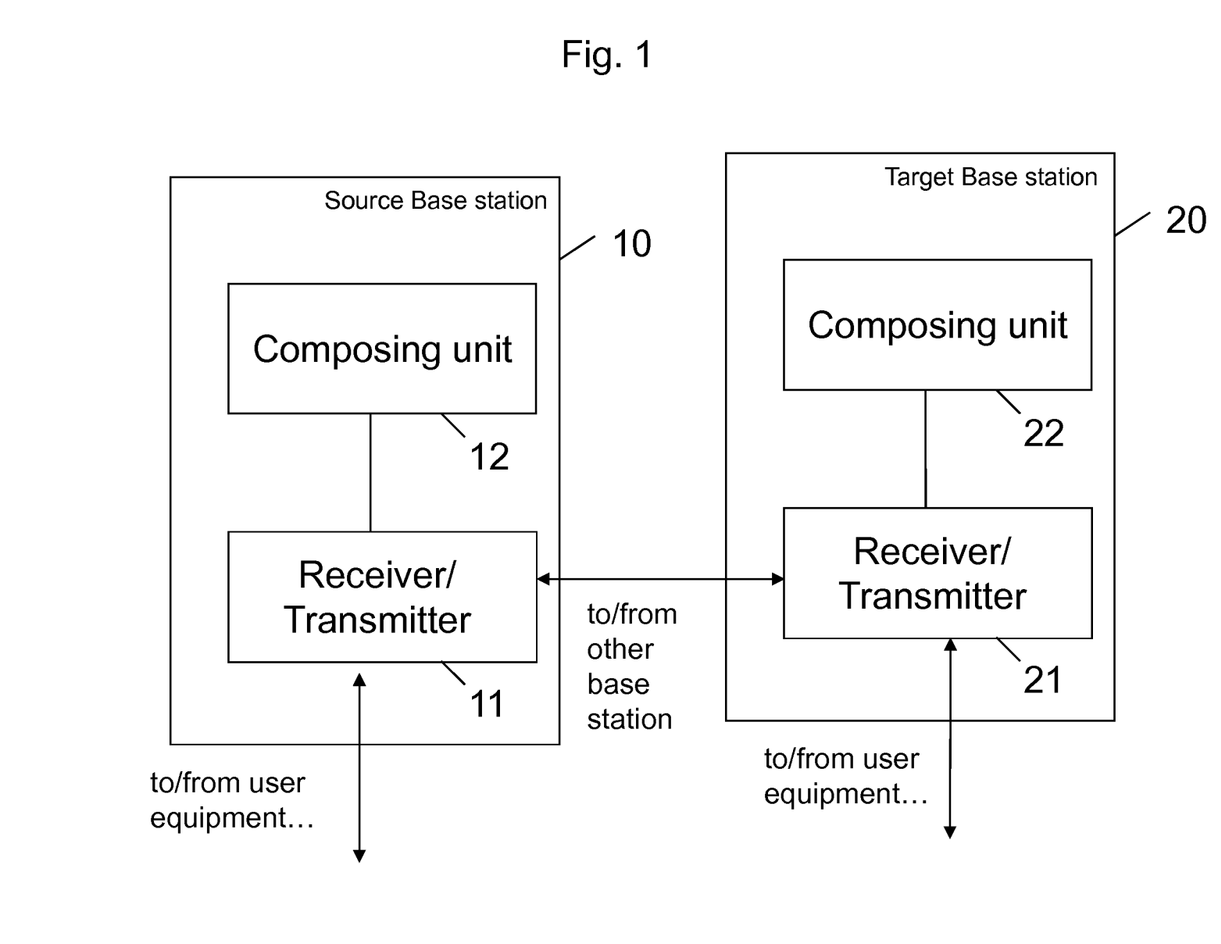
FIG. 1 is a block diagram showing an example of a source base station and a target base station according to certain embodiments of the present invention

FIG. 1 is a block diagram showing an example of a source base station and a target base station according to certain embodiments of the present invention.

As shown in FIG. 1, according to an exemplary embodiment of the present invention, the source base station 10 comprises a transmitter/receiver 11, and a composing unit 12.

The composing unit 12 of the base station 10, to which a user equipment is connected, i.e. the base station 10 is a source base station, composes a first signaling message including information whether a target base station, to which handover of the user equipment is to be performed, supports assistance information and the transmitter/receiver 11 transmits the first signaling message to the user equipment.

Further, the composing unit 12 of the source base station 10, composes a second signaling message including information whether the source base station supports assistance information and the transmitter/receiver 11 transmits the second signaling message to the user equipment.

In this regard, it is noted that the order of the first and second signaling message is not limited to the above described order. That is, the second signaling message may be sent before the first signaling message is sent or vice versa.

For example, the second signaling message is sent at a time of connection reconfiguration after connection setup, and the first signaling message is sent at handover of the user equipment.

As also shown in FIG. 1, according to an exemplary embodiment of the present invention, the target base station 20 comprises a transmitter/receiver 21, and a composing unit 22.

The composing unit 22 of the base station, to which a handover of the user equipment is to be performed, i.e. the base station 20 is a target base station, composes a signaling message including information whether the target base station supports assistance information. Further, the target base station transmits the signaling message via the transmitter/receiver 21 in the handover command to the source based station during handover.

Alternatively, according to another aspect, the target base station transmits the signaling message via the transmitter/receiver 21 in the handover command to the user equipment after handover.

Figure 2:
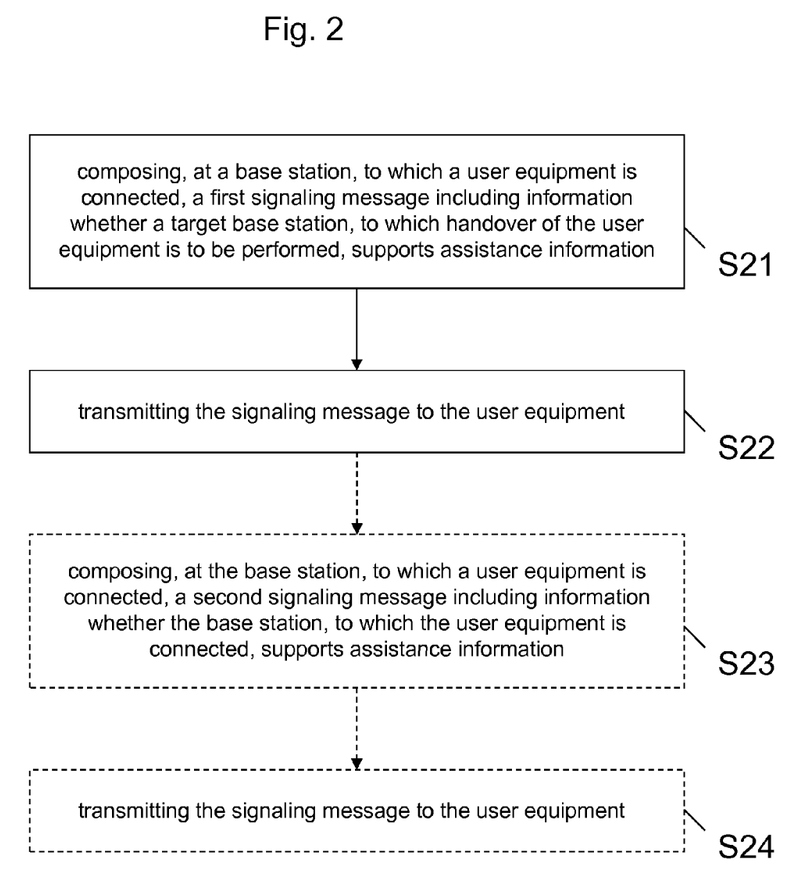
FIG. 2 is a flowchart illustrating processing of the source base station according to certain embodiments of the present invention.

FIG. 2 is a flowchart illustrating processing of the base station according to certain embodiments of the present invention.

According to an embodiment of the present invention, first, in a step S21, the base station, to which a user equipment is connected, which is a source base station in the present example, composes a first signaling message including information whether the target base station supports assistance information and then transmits the signaling message to the user equipment in a step S22.

According to certain embodiments of the present invention, the source base station further composes, in a step S23, a second signaling message including information whether the source base station supports assistance information, and transmits the second signaling message to the user equipment in a step S24.

According t further aspects of the present invention, the first signaling message is sent at handover of the user equipment, and the second signaling message is sent at a time of connection reconfiguration after connection setup.

Further, each of the first and second signaling message is the same kind of message, and moreover, each of the first and second signaling message is a RRCConnectionReconfiguration message.

Figure 3:
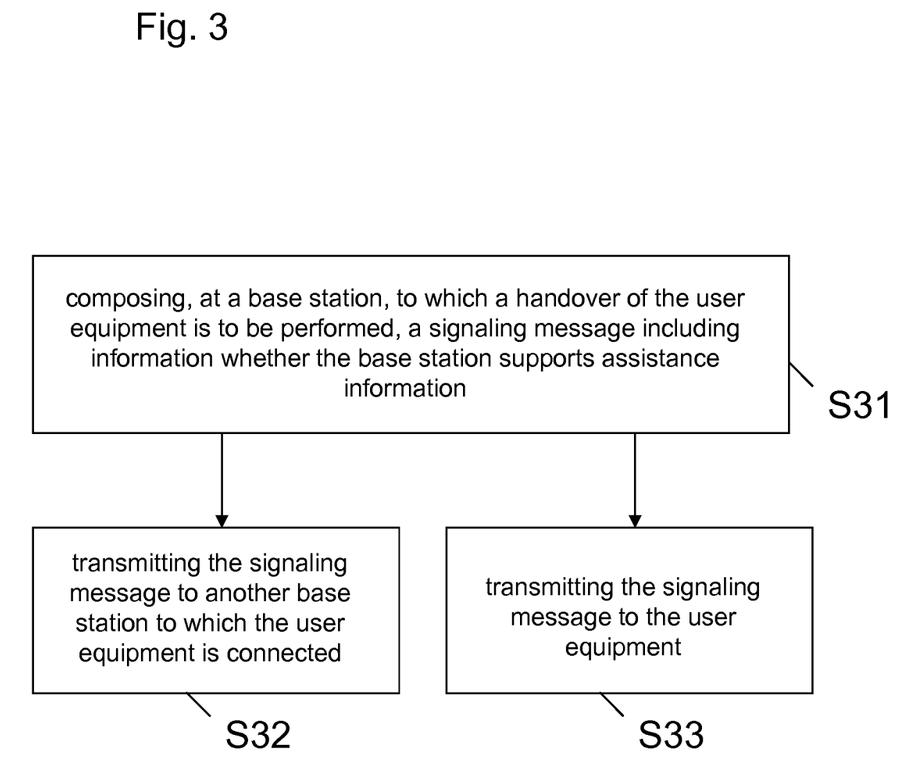
FIG. 3 is a flowchart illustrating processing of the target base station according to certain embodiments of the present invention.

FIG. 3 is a flowchart illustrating processing of the base station according to certain embodiments of the present invention.

According to an embodiment of the present invention, first, in a step S31, the base station, to which handover the user equipment is to be performed, which is a target base station in the present example, composes a signaling message including information whether the target base station supports assistance information, and the base station transmits the signaling message to another base station, to which the user equipment is connected, in a step S32.

Alternatively, according to another aspect, in a step S33, the target base station transmits the signaling message directly to the user equipment.

According to certain embodiments of the present invention, the signaling message is transmitted at/after handover of the user equipment.

Figure 4:
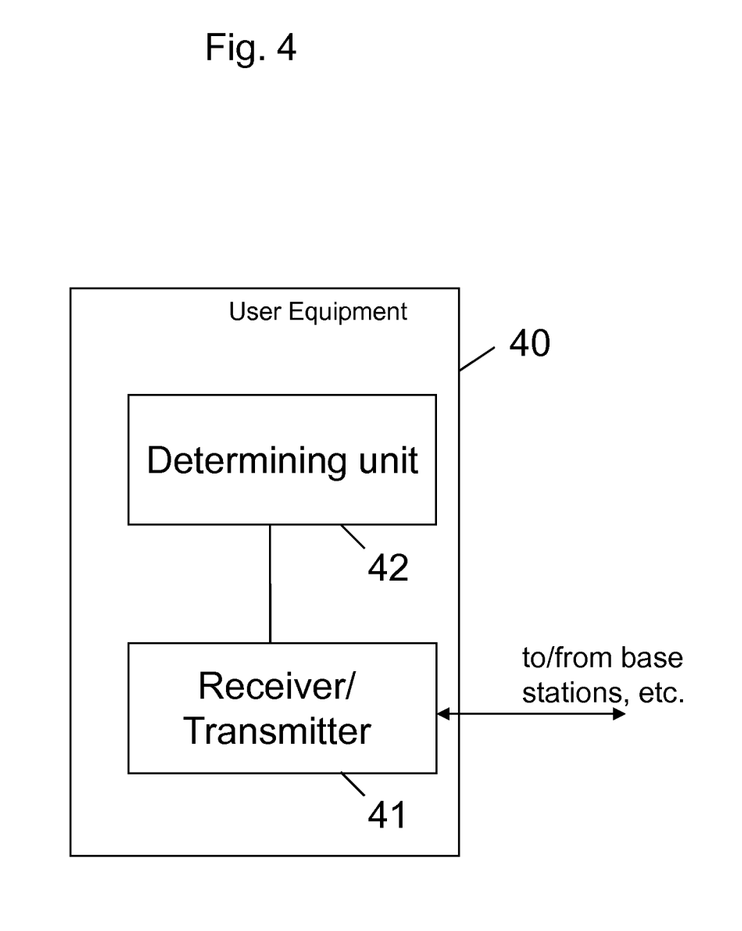
FIG. 4 is a block diagram showing an example of a user equipment according to certain embodiments of the present invention.

FIG. 4 is a block diagram showing an example of a user equipment according to certain embodiments of the present invention.

As shown in FIG. 4, according to an embodiment of the present invention, the user equipment 40 comprises a receiver/transmitter 41 and a determining unit 42.

The receiver/transmitter 41 of the user equipment, receives a first signaling message including information whether a target base station, to which handover of the user equipment is to be performed, supports assistance information.

Further, the receiver/transmitter 41 of the user equipment receives a second signaling message including information whether the source base station, to which the user equipment is connected, supports assistance information.

Then, the determining unit 42 of the user equipment determines based on the information included in the first signaling message and second signaling message, whether each of the source base station and the target base station supports assistance information.

Figure 5:
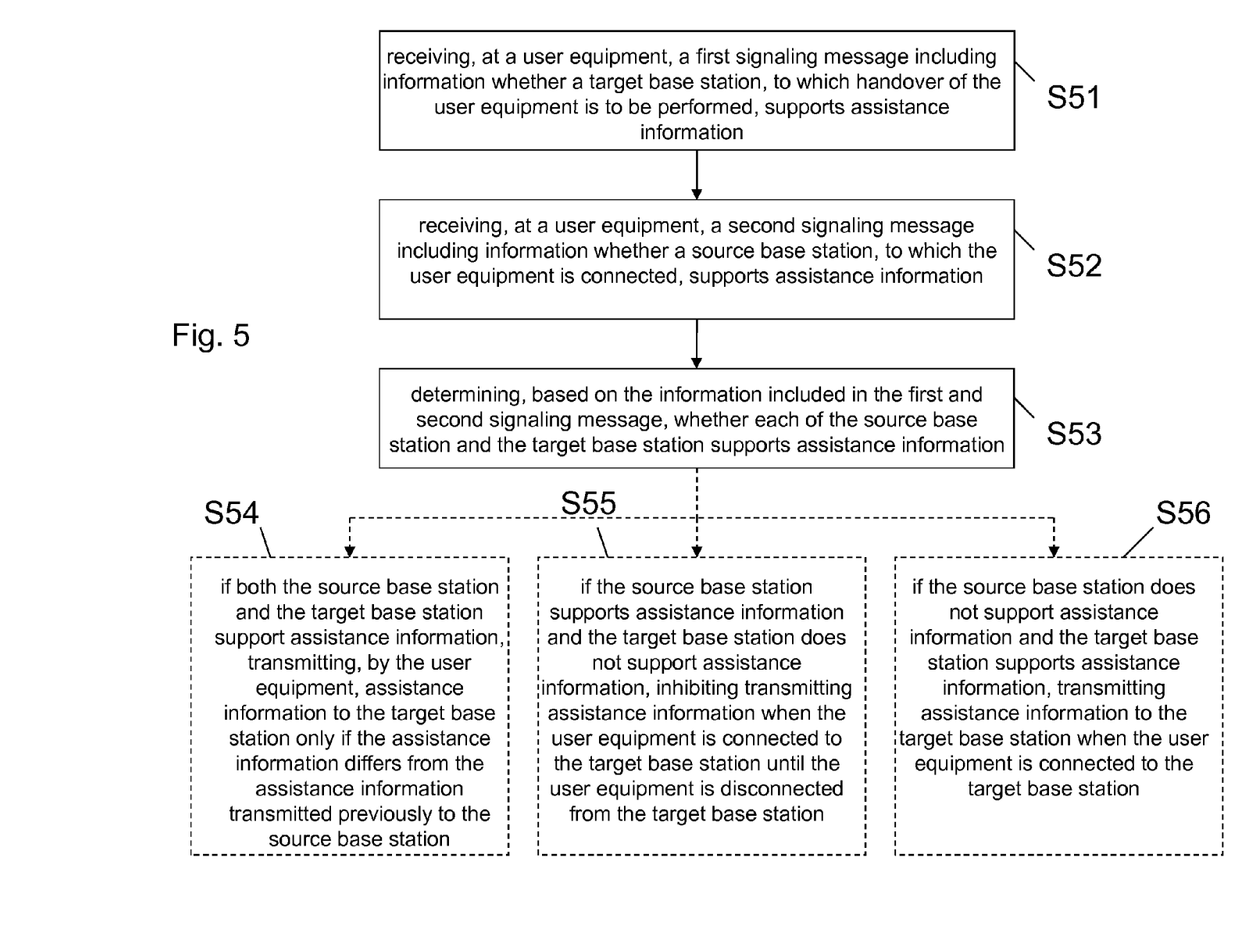
FIG. 5 is a flowchart illustrating processing of the user equipment according to certain embodiments of the present invention.

FIG. 5 is a flowchart illustrating processing of the user equipment according to certain embodiments of the present invention.

According to an embodiment of the present invention, first, in a step S51, the user equipment, receives a first signaling message including information whether a target base station, to which handover fo the user equipment is to be performed, supports assistance information.

Further, in a step S52, the user equipment receives a second signaling message including information whether a source base station, to which the user equipment is connected, supports assistance information.

Then, in a step S53, the user equipment determines, based on the information included in the first signaling message and the second signaling message, whether each of the source base station and the target base station supports assistance information.

Then, in a step S54, if it is determined in step S53 that both the source base station and the target base station support assistance information, the recevier/transmitter 41 of the user equipment 40 transmits assistance information to the target base station only if the assistance information differs from the assistance information transmitted previously to the source base station.

Further, in a step S55, if it is determined in step S53 that the source base station supports assistance information and the target base station does not support assistance information, the user equipment 40 inhibits transmitting assistance information when the user equipment is connected to the target base station until the user equipment is disconnected from the target base station.

Moreover, in a step S56, if it is determined in step S53 that the source base station does not support assistance information and the target base station supports assistance information, the receiver/transmitter 41 of the user equipment 40 transmits assistance information to the target base station when the user equipment is connected to the target base station.

According to certain embodiment of the present invention, the first signaling message is sent at a time of connection reconfiguration after connection setup. Further, the second signaling message is transmitted at handover of the user equipment.

Further, according to certain embodiments of the present invention, each of the first and the second signaling message may be the same kind of message and may be a RRCConnectionReconfiguration message.

In the foregoing exemplary description of the user equipment and the base stations, only the units that are relevant for understanding the principles of the invention have been described using functional blocks. The user equipment and the base stations may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. the user equipment or the base stations (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses and user equipments/base stations, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method comprising:

composing, at a target base station, to which handover of a user equipment is to be performed, a signaling message including information whether the target base station supports reception of assistance information from the user equipment, wherein said assistance information is used to assist a network in Long Term Evolution for at least one of multimedia broadcast-multicast service (MBMS), in-device coexistence (ICE), and enhancements for diverse data applications (EDDA);

transmitting the signaling message to a source base station to which the user equipment is connected; and when the target base station supports reception of assistance information from the user equipment, receiving assistance information from the user equipment when the user equipment is connected to the target base station.

2. The method according to claim 1, wherein the signaling message is sent at handover of the user equipment.

3. A method comprising:
receiving, at a user equipment, a first signaling message including information whether a target base station, to which handover of the user equipment is to be performed, supports reception of assistance information from the user equipment, wherein said assistance information is used to assist a network in Long Term Evolution for at least one of multimedia broadcast-multicast service (MBMS), in-device coexistence (ICE), and enhancements for diverse data applications (EDDA);
receiving, at the user equipment, a second signaling message including information whether a source base station, to which the user equipment is connected, supports reception of assistance information from the user equipment;
determining, based on the information included in the first signaling message and the second signaling message, whether each of the source base station and the target base station supports reception of assistance information from the user equipment; and
when it is determined that the source base station does not support reception of assistance information from the user equipment and the target base station supports reception of assistance information from the user equipment, transmitting assistance information to the target base station when the user equipment is connected to the target base station.

4. An apparatus comprising:
at least one processor; and
at least one memory including computer program code, the at least one memory and the computer program code being configured, with the at least one processor, to cause the apparatus to perform at least the following, when a handover of a user equipment to the apparatus is to be performed:
compose a signaling message including information whether the apparatus supports reception of assistance information from the user equipment, wherein said assistance information is used to assist a network in Long Term Evolution for at least one of multimedia broadcast-multicast service (MBMS), in-device coexistence (ICE), and enhancements for diverse data applications (EDDA);
transmit the signaling message to a source base station to which the user equipment is connected; and
when the target base station supports reception of assistance information from the user equipment, receive assistance information from the user equipment when the user equipment is connected to the target base station,
wherein the apparatus is a target base station.

5. The apparatus according to claim 4, wherein the signaling message is sent at handover of the user equipment.

6. The apparatus according to claim 4, wherein the signaling message is an RRCConnectionReconfiguration message.

7. An apparatus comprising:
at least one processor; and
at least one memory including computer program code, the at least one memory and the computer program code being configured, with the at least one processor, to cause the user equipment to perform at least the following:
receive a first signaling message including information whether a target base station, to which handover of the apparatus is to be performed, supports reception of assistance information from the user equipment, wherein said assistance information is used to assist a network in Long Term Evolution for at least one of multimedia broadcast-multicast service (MBMS), in-device coexistence (ICE), and enhancements for diverse data applications (EDDA);
receive a second signaling message including information whether a source base station, to which the apparatus is connected, supports reception of assistance information from the apparatus;
determine, based on the information included in the first signaling message and the second signaling message, whether each of the source base station and the target base station supports reception of assistance information from the apparatus; and
when it is determined that the source base station does not support reception of assistance information from the user equipment and the target base station supports reception of assistance information from the user equipment, transmitting assistance information to the target base station when the user equipment is connected to the target base station,
wherein the apparatus is a user equipment.

8. A computer program product comprising a non-transitory computer-readable storage medium bearing computer program code embodied therein for use with a computer, the computer program code comprising code for performing:
composing, at a target base station, to which handover of a user equipment is to be performed, a signaling message including information whether the target base station supports reception of assistance information from the user equipment, wherein said assistance information is used to assist a network in Long Term Evolution for at least one of multimedia broadcast-multicast service (MBMS), in-device coexistence (ICE), and enhancements for diverse data applications (EDDA);
transmitting the signaling message to a source base station to which the user equipment is connected; and
when the target base station supports reception of assistance information from the user equipment, receiving assistance information from the user equipment when the user equipment is connected to the target base station.

9. A computer program product comprising a non-transitory computer-readable storage medium bearing computer program code embodied therein for use with a computer, the computer program code comprising code for performing:
receiving, at a user equipment, a first signaling message including information whether a target base station, to which handover of the user equipment is to be performed, supports reception of assistance information from the user equipment, wherein said assistance information is used to assist a network in Long Term Evolution for at least one of multimedia broadcast-multicast service (MBMS), in-device coexistence (ICE), and enhancements for diverse data applications (EDDA);
receiving, at the user equipment, a second signaling message including information whether a source base station, to which the user equipment is connected, supports reception of assistance information from the user equipment;

determining, based on the information included in the first signaling message and the second signaling message, whether each of the source base station and the target base station supports reception of assistance information from the user equipment; and when it is determined that the source base station does not support reception of assistance information from the user equipment and the target base station supports reception of assistance information from the user equipment, transmitting assistance information to the target base station when the user equipment is connected to the target base station.

* * * * *